United States Patent Office 2,785,045
Patented Mar. 12, 1957

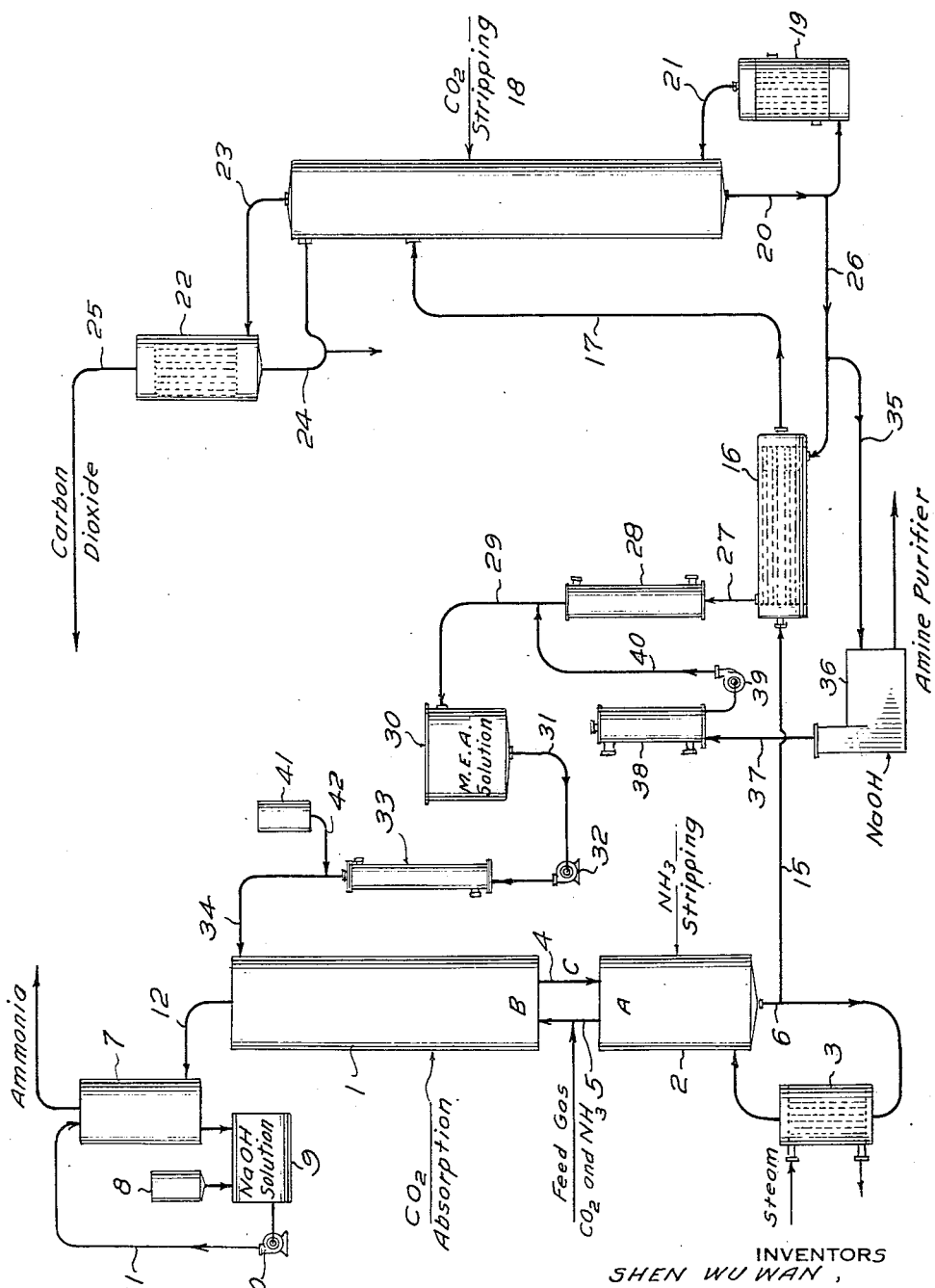

2,785,045

SEPARATION OF CARBON DIOXIDE FROM AMMONIA

Shen Wu Wan, Bronx, and Samuel Strelzoff, New York, N. Y., and Claude J. Barr, Stamford, Conn., assignors to Chemical Construction Corporation, New York, N. Y., a corporation of Delaware Application November 6, 1952, Serial No. 319,084

5 Claims. (Cl. 23—2)

This invention relates to a method and apparatus for treating gaseous mixtures containing both ammonia and carbon dioxide for the separation and separate recovery of these two materials.

Mixtures of carbon dioxide and ammonia, with or without other fixed gases and water vapor, are encountered in a number of industries. Thus, for example, such mixtures are found in coal gas and in the conversion of ammonium carbamate to urea. The process of our invention is particularly well adapted for the treatment of concentrated gas mixtures of the type encountered in urea manufacture and in the manufacture of melamine by heating urea, either alone or in the presence of anhydrous ammonia, since it accomplishes the rapid and substantially complete separation of the two gases.

In its broadest aspects our process is based on the removal of the carbon dioxide from the ammonia and other gases, if present, by scrubbing the feed gas with an aqueous solution of a weak base capable of reversible combination with carbon dioxide. A wide variety of weak bases such as sodium carbonate, potassium carbonate, water soluble amines and the like are known to be suitable for carbon dioxide absorption, and may be used, but the preferred class are the water-soluble alkylolamines such as the mono-, di- and triethanolamines, propanolamines and the like. It will be understood that carbon dioxide-removing processes employing these amines are well known, a typical installation being described in U. S. Reissue Patent No. 18,958, dated September 26, 1933. However these processes have not heretofore been capable of treating ammonia-containing gases because substantial quantities of ammonia are dissolved in the absorbing solution and are evolved with the carbon dioxide when this solution is regenerated.

We have found that a substantially complete separation of carbon dioxide from mixtures thereof with ammonia can be obtained by a combined absorption and partial stripping of the aqueous absorbing solution, whereby contamination of the enriched solution with substantial quantities of dissolved ammonia is prevented. In the preferred practice of our invention the enriched solvent from the absorbing stage is subjected to an initial heating the extent of which is limited to that necessary to strip out or drive off the dissolved ammonia without, however, liberating more than a minor proportion of the absorbed carbon dioxide. The gases so liberated are returned to the absorption stage, thus preventing any substantial loss of ammonia from the gases undergoing treatment. The partially stripped enriched solvent is then further heated in a regenerating stage, with the result that most of its combined carbon dioxide is liberated as a substantially ammonia-free carbon dioxide gas, after which the regenerated solvent is cooled and returned to the absorption stage.

The invention will be described in greater detail with reference to the accompanying drawing wherein the single figure is a flow diagram of a preferred embodiment thereof. In this flow sheet the pieces of equipment are indicated more or less diagrammatically, it being understood that any known or preferred equipment may be used for the purpose indicated.

Referring to the drawing, reference numeral 1 indicates generally a carbon dioxide absorber wherein the feed gas may be scrubbed with a cooled aqueous carbon dioxide absorbing agent which is preferably an alkylolamine solvent. The absorber may be a packed tower, a bubble plate column, a gas washer or any other suitable form of gas and liquid contact apparatus that is preferably provided with internal or external cooling coils for removing heat generated by the carbon dioxide absorption. The absorber 1 is operated in combination with a stripping column 2 which may be a separate column, as shown, or may be a lower extension of the carbon dioxide absorber 1. A suitable heater 3 is provided in or adjacent the base of the stripping column 2 in order to impart an initial limited heating to the enriched solvent, and downflow and upflow lines 4 and 5 are provided if two separate columns are used. The feed gas, containing both carbon dioxide and ammonia, may be introduced in the upflow line 5 as indicated by the arrow, or it may be introduced directly into the base of the column 1. A small caustic scrubber 7, fed with aqueous alkali from a supply tank 8 through storage tank 9, recirculating pump 10 and line 11 is preferably connected to the gas outlet line 12 from the top of the absorption tower to remove any traces of carbon dioxide that may be present in the exit gases.

In operation the feed gas is scrubbed with cooled aqueous alkylolamine solvent in the tower 1, whereby substantially all of its carbon dioxide content is absorbed with concomitant solution of ammonia in the solvent. The enriched solvent passes downwardly through line 4 into the stripping column 2 wherein it is subjected to an initial limited heating. This heating is carried out only to the extent necessary to drive off the dissolved ammonia which, with a small part of the carbon dioxide that is also unavoidably evolved, is recirculated back to the absorption column through line 5. It will be seen, therefore, that when steady conditions are attained the ammonia dissolved in the absorption column 1 is liberated in the stripping column 2 and reintroduced into the absorber so that there is substantially no net loss of ammonia from the gases being processed. These gases, substantially free from carbon dioxide, are withdrawn from the column 1 through line 12 and after being washed with aqueous alkali, if necessary, are obtained in a carbon dioxide-free condition. The ammonia gases so purified may be converted into liquid ammonia either by direct condensation or after compressing without interference from the plugging of condensers or pipes due to ammonium carbonate or ammonium carbamate formation.

The carbon dioxide removed from the gases in the absorber 1 and contained in the enriched solvent leaving the base of the stripping column 2 is recovered by subjecting the enriched solvent to a second and more extensive heating in a regenerating stage. For this purpose a stream of the enriched solvent is withdrawn from column 2 through lines 6 and 15 and passed through heat exchanger 16 and line 17 into a regenerating tower or column 18 which may be a fractionating column provided with packing or with bubble plates or other contact means. The column 18 is provided with a reboiler or other heating means 19, which is preferably a tubular heater in which high pressure steam is condensed around the heating tubes, the solvent flowing downwardly from the base of the tower through line 20, upwardly through the tubes of the heater and being returned through line 21. A tubular condenser 22, supplied with cooling water, receives the gases and vapors leaving the top of the regenerating column through line 23 and a part of the condensate draining therefrom through line 24 is returned to the column 18 as reflux, the remainder being discarded. A stream of substantially pure carbon dioxide, containing little or no ammonia, is drawn off from the top of the condenser through line 25.

The regenerated or lean solvent solution is withdrawn from the column 18 through line 26, which preferably connects with line 20, and is passed through the outer portion of heat exchanger 16 to assist in heating the enriched solvent entering from line 15. The lean solvent leaves the heat exchanger 16 through line 27 and is further cooled in a cooler 28 by indirect heat exchange with cooling water, after which it passes through line 29 into a storage tank or surge tank 30. From this tank a stream of the solvent is continuously passed by way of line 31, pump 32, cooler 33 and line 34 into the top of the absorption tower 1 for reuse in purifying further quantities of feed gas.

It will be seen from the foregoing description that the stream of aqueous alkylolamine solvent is recirculated continuously through an absorption stage, an ammonia stripping stage wherein it is partially heated, a regenerating stage wherein it is further heated, and a cooling stage which may comprise several successive cooling steps. Experience has shown that this repeated heating and cooling of the solvent may cause decomposition products to form therein. In order to offset this degradation, a small side stream of the regenerated or lean solvent may be taken off from line 26 through line 35 and passed into an amine purifier 36 which is a still in which the amine is distilled in the presence of sodium hydroxide or other alkali. The resulting vapors of purified alkylolamine and water are passed through line 37 into a condenser 38 and the condensed alkylolamine is returned to the remainder of the solvent by pump 39 and line 40. The solvent may be further protected against decomposition, if desired, by adding small quantities of a known or preferred inhibitor such as copper iodide, vanadium compounds and the like. A water solution of such an inhibitor may be maintained, for example, in a tank 41 and introduced continuously in small amounts into the recirculating solvent through line 42.

The invention will be further illustrated by the following specific example. It will be understood, however, that although this example may describe in detail some of the preferred features of the invention, including specific solvents, concentrations and operating temperatures, it is given primarily for purposes of illustration, and that modifications and substitutions may be resorted to within the scope of the appended claims.

*Example*

A substantially complete separation of carbon dioxide was required from a feed gas produced in the manufacture of urea. In this process ammonium carbamate is partially converted into urea by heating in an autoclave at high temperatures. Since the conversion is only partially complete, a mixture of carbon dioxide and ammonia, together with water vapor, is evolved and the ingredients must be recovered separately for reuse.

The gas mixture supplied to the separation process contained 880 lbs. per hour of carbon dioxide, 680 lbs. of ammonia and 720 lbs. of water vapor, or a total of 2280 lbs. per hour; the gas was supplied at a temperature of 80° C. and 16.7 lbs. per square inch gage pressure. The regenerated or lean solvent entered the absorber through line 34 at 35° C. and contained 1.1% of $CO_2$, 57.4% of monoethanolamine and 41.5% of water. The quantity of lean solvent introduced at this point was 10,374.3 lbs. per hour. The enriched solvent solution leaving the absorption and partial stripping system through line 15 contained 0.05% $NH_3$, 8.3% $CO_2$, 49.8% monoethanolamine and 41.85% $H_2O$. The ammonia gases withdrawn from the absorber through line 12 contained 0.095 mol percent of carbon dioxide.

The efficiency of the ammonia recirculation between the absorption stage and the ammonia stripping stage is clearly shown by the compositions of the materials at the points marked A, B and C on the drawing. At point A, which represents the vapor exit from the ammonia stripping column, the flow of gases amounted to 519 lbs. per hour of ammonia, 689.5 lbs. per hour of carbon dioxide and 460 lbs. per hour of water vapor; a total of 1668.5 lbs. of gas. At point B the total gas flow (including the feed gas) was 1199 lbs. per hour of ammonia, 1569.5 lbs. of carbon dioxide and 1180 lbs. of water vapor. The flow of enriched solvent at point C, i. e., in line 4, amounted to 5955 lbs. of monoethanolamine and 5462 lbs. of water per hour, this solution containing 1682 lbs. of carbon dioxide and 525 lbs. of ammonia per hour, or a total of 13,624 lbs. of enriched solvent per hour. The temperature of the liquid in line 6 was 110° C.; following the heat exchanger the temperature in line 17 was about 120° C., and at the base of tower 18 the temperature of the liquid was about 125° C. The heat exchanger 16 and cooler 28 were operated to maintain the monoethanolamine solution in surge tank 30 at about 74° C., from which it was further cooled to 35° C in the cooler 33.

When the foregoing operating conditions were maintained a flow of carbon dioxide gases leaving the reflux condenser 22 through line 25 was obtained at the rate of 878.2 lbs. per hour of $CO_2$, 697 lbs. per hour of water vapor and 6.2 lbs. per hour of ammonia. The ammonia gas was evolved from the absorber through line 12 at the rate of 673.8 lbs. per hour of ammonia, 23.1 lbs. per hour of water vapor and 1.7 lbs. per hour of carbon dioxide at approximately 15 lbs. p. s. i. g. pressure.

It will be understood that the operating conditions given in the foregoing example can be modified considerably within the scope of our invention. Thus, for example, the regenerated monoethanolamine solution entering the absorber through line 34 may contain from about 40% to about 60% by weight of ethanolamine and it may enter at any convenient temperature up to about 60° C. Ususally temperatures below about 15–20° C. are not advisable since they are not readily obtainable with ordinary cooling water and no corresponding increase in efficiency is noted when temperatures lower than these are used.

The temperature of the enriched solvent at the bottom of the absorption column (i. e., at point B) can likewise be varied through the range of about 60–100° C. The temperature of the solvent at this point will depend largely on the temperature of the feed gas and also on whether positive cooling means are used in the absorber. Thus, for example, where the absorber is a bubble plate column it is frequently desirable to withdraw streams of solvent from several of the plates, to pass the streams of liquid so withdrawn over water-containing cooling coils or other suitable cooling means and to return the cooled solvent to the plates from which it was withdrawn. The same result can of course be obtained by providing cooling coils on the bubble plates themselves. Such cooling means are most advantageously applied over the lower two thirds of the absorption column.

The temperature within the ammonia stripping column 2 may likewise be varied, a suitable range being from about 105° C. to about 120° C. It will be understood that the most advantageous temperature or temperature range to be maintained within this column is that which will liberate substantially all of the dissolved ammonia from the enriched solvent without, however, excessive carbon dioxide liberation; in other words, the enriched solution should not be heated above a temperature which will ensure liberation of the ammonia.

The regeneration of the absorbing solution in the column 18 may be carried out at any suitable temperature up to the range at which undesirable decomposition of the ethanolamine or other carbon dioxide absorbent is encountered. In the case of monoethanolamine the maximum regeneration temperature is usually about 150° C.

Finally, the process may be operated under any suitable pressure. In cases where the ammonia or ammonia-containing gases are to be used in the production of liquid ammonia it may be convenient to operate the absorber 1 under substantial superatmospheric pressures, such as up to 5-10 atmospheres or higher, and such operating pressures are included within the scope of our invention. Similarly, the stripping column 18 may be operated at elevated pressures. In general, therefore, it will be seen that the process of our invention may be applied within relatively wide operating limits for the production of ammonia gases and carbon dioxide for a wide variety of purposes.

What we claim is:

1. A method of treating gaseous mixtures containing both ammonia and carbon dioxide which comprises scrubbing said gases with a cooled aqueous alkylolamine solvent at temperatures of about 15°-60° C. in a scrubbing zone and thereby absorbing the carbon dioxide while simultaneously dissolving ammonia in the solvent, withdrawing the resulting purified gas from the upper end of the said zone and withdrawing said enriched solvent from the lower end of said zone, recovering the dissolved ammonia by subjecting the enriched solvent in an initial stripping zone located below the scrubbing zone to an initial heating at 105-120° C. and simultaneously returning the resulting evolved gases to the scrubbing zone, drawing off the resulting partially stripped enriched solvent, regenerating the solvent so withdrawn by subjecting it to a second heating in a separate zone and thereby liberating most of the carbon dioxide absorbed therein, drawing off and recovering the carbon dioxide so obtained, and cooling the regenerated solvent and returning it to the scrubbing zone.

2. A method according to claim 1 in which the alkylolamine is monoethanolamine.

3. A method of separating carbon dioxide from a gaseous mixture thereof with ammonia which comprises recirculating a solvent comprising an aqueous solution of a water-soluble alkylolamine through an absorption stage, and ammonia stripping stage, a regenerating stage and a cooling stage, scrubbing said gas mixture in the absorption stage with cooled solvent from the cooling stage at temperatures of about 15°-60° C. and thereby absorbing the carbon dioxide along with small amounts of ammonia, heating the resulting enriched solvent in the ammonia stripping stage at 105-120° C. and at substantially the pressure existing in the absorption stage, thereby liberating the ammonia and a part of the absorbed carbon dioxide, and simultaneously returning the gases so evolved to the absorption stage, further heating the enriched solvent in the regenerating stage at about 120°-150° C. and thereby liberating most of the remaining carbon dioxide therein, and drawing off and recovering the carbon dioxide so obtained.

4. A method according to claim 3 in which the alkylolamine is monoethanolamine.

5. A method of obtaining a substantially complete separation of gaseous carbon dioxide from gaseous ammonia which comprises scrubbing a gaseous mixture containing ammonia and carbon dioxide with an aqueous 40-60% monoethanolamine solution at temperatures within the range of 20°-60° C. in a scrubbing zone and thereby absorbing the carbon dioxide while simultaneously dissolving ammonia in the solvent, withdrawing the resulting ammonia-containing gas from the upper end of said zone and withdrawing said enriched solvent from the lower end of said zone, heating the enriched solvent to a temperature within the range of 105-120° C. in an initial stripping zone located below the scrubbing zone and thereby removing substantially all of the dissolved ammonia therefrom while liberating only a small proportion of the absorbed carbon dioxide and returning the evolved gases to the scrubbing zone, drawing off the resulting partially stripped enriched solvent and subjecting it to a second heating at temperatures of 120-150° C. in a separate zone and thereby liberating most of the carbon dioxide absorbed therein, cooling the resulting regenerated solvent and returning it to the scrubbing zone.

References Cited in the file of this patent
UNITED STATES PATENTS

| Re. 18,958 | Bottoms | Sept. 26, 1933 |
| 1,654,782 | Bird | Jan. 3, 1928 |
| 1,783,901 | Bottoms | Dec. 2, 1930 |
| 1,817,667 | Blau | Aug. 4, 1931 |
| 1,934,472 | Allen | Nov. 7, 1933 |
| 2,031,632 | Bottoms | Feb. 25, 1936 |
| 2,043,965 | Smeykal | June 9, 1936 |
| 2,122,544 | Conway | July 5, 1938 |
| 2,148,971 | Conway | Feb. 28, 1939 |
| 2,180,006 | Hasche | Nov. 14, 1939 |
| 2,399,142 | Reed | Apr. 23, 1946 |
| 2,477,314 | Scharmann | July 26, 1949 |
| 2,600,328 | Riesenfeld | June 10, 1952 |
| 2,613,132 | Hutchinson | Oct. 7, 1952 |

OTHER REFERENCES

Perry: "Chemical Engineer's Handbook," page 704, 3rd ed., McGraw-Hill Book Co., N. Y., 1950.